United States Patent

[11] 3,574,398

| | | |
|---|---|---|
| [72] | Inventor | Michael C. Hairgrove<br>2106 A. Echols, Bryan, Tex. 77801 |
| [21] | Appl. No. | 776,157 |
| [22] | Filed | Nov. 15, 1968 |
| [45] | Patented | Apr. 13, 1971 |

[54] HEAD SUPPORTS FOR USE IN MOVING VEHICLES
4 Claims, 4 Drawing Figs.

[52] U.S. Cl.................................................. 297/410,
297/218
[51] Int. Cl................................................... A47c 7/36,
A47c 7/42
[50] Field of Search.......................................... 297/218,
391, 407—410

[56] References Cited
UNITED STATES PATENTS
480,822  8/1892  Mayes........................ 297/410

3,376,064  4/1968  Jackson........................ 297/410X
3,159,426  12/1964  Kerr............................ 297/408

Primary Examiner—Casmir A. Nunberg
Attorney—Carl B. Fox, Jr.

ABSTRACT: Head supports having portions for supporting the back and each side of the head of a person, particularly for use in moving vehicles, where there is possibility of collision which might throw the person in any direction, and in particular, might throw the head of the person rearward or sideward with respect to the heavier body of the person, thereby causing damage to the neck. The supports do not bind the head to a stationary or rigid position, but fit the head loosely enough that the head may turn at least to an extent permitting reasonable freedom of motion and comfort. The side support positions do not limit vision to either side.

PATENTED APR 13 1971
3,574,398
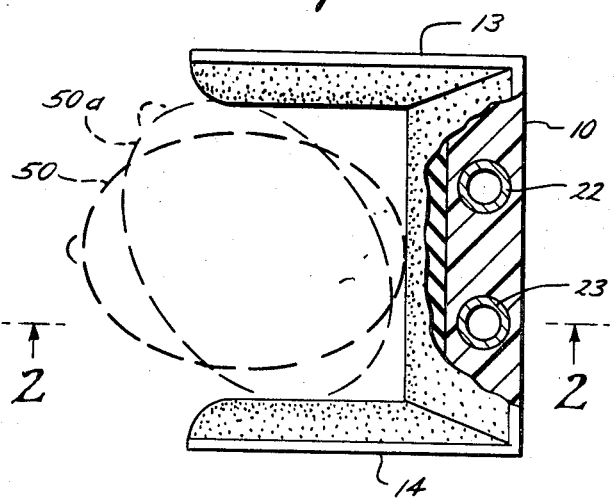
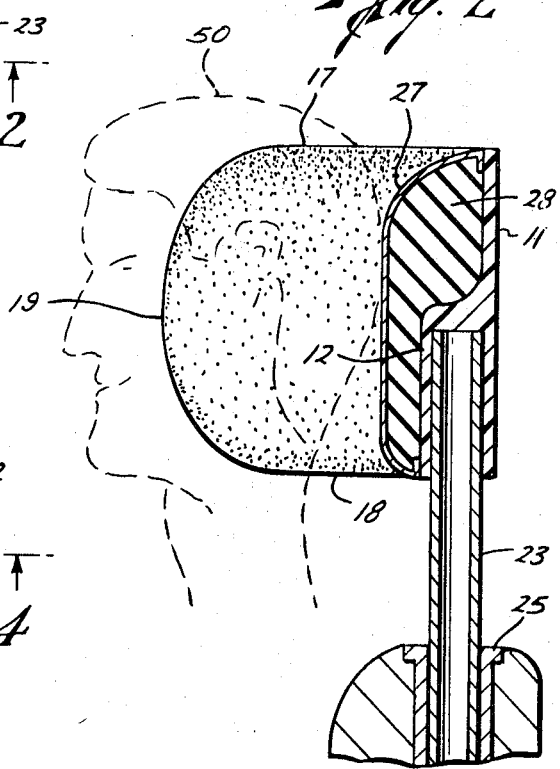
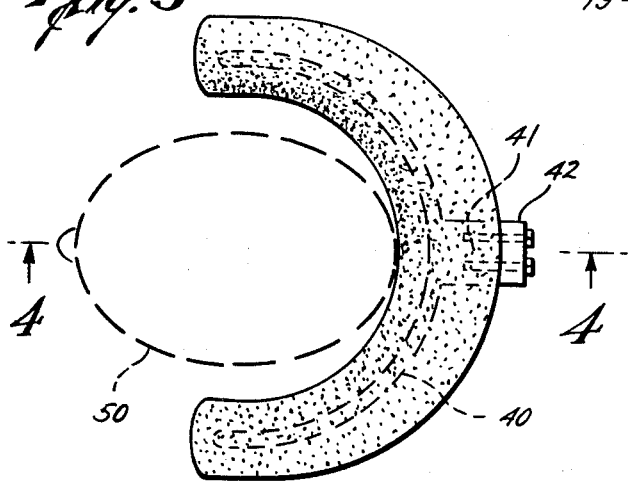
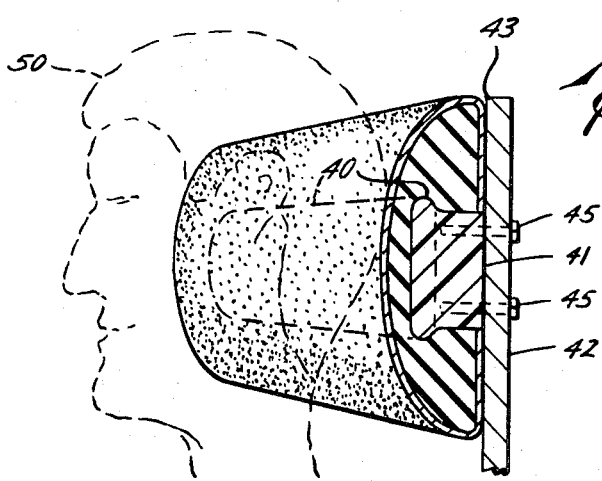
Michael C. Hairgrove
INVENTOR.
BY Carl B. Fox, Jr.
ATTORNEY

3,574,398

HEAD SUPPORTS FOR USE IN MOVING VEHICLES

BACKGROUND OF THE INVENTION

In collisions of vehicles, with other vehicles or with stationary or movable objects, the head of a person in the vehicle is apt to move or be moved differently, in speed and/or direction, with respect to the trunk of the body, to possibly cause injury to the neck. A case in point is the familiar "whiplash" injury, which occurs most commonly when a vehicle is struck from the rear by a second vehicle, the first vehicle being either stopped or moving forward more slowly than the second vehicle. The head of a person in the first vehicle, if not held rigidly, is first thrown rapidly rearward, since it is not supported against such movement, and then thrown rapidly forward because of the force imparted to the head by the impact, frequently causing severe and long lasting injury to the neck and spine. The trunk of the person is usually held against rearward movement by the back of the seat, so that the trunk does not move rapidly to and fro as does the head.

Similar effects may occur when a vehicle is struck from the side. The trunk or body is frictionally engaged by the seat back so that its movements are somewhat restricted, while the head is not supported against sideways movements, and the neck and spine may receive injuries.

Head supports, supporting only the back of the head, are now required to be provided in automobiles, and these will greatly decrease neck injuries resulting from impacts to the rear of automobiles. But side support of the head is not provided by these devices.

SUMMARY OF THE INVENTION

The invention provides head supports for use in moving vehicles of any type, which support the head of the person from the back and from each side, so that in a collision from any direction the head is supported to prevent injuries resulting from unrestrained head movements with respect to the movements of the body or trunk of the person. The supports may be of three-sided rectilinear shape, or of curved U-shape, and are preferably well padded to prevent localized impact injuries to the head. The sides or "wings" of the supports extend forward spaced along the sides of the head to forward extents insufficient to inhibit lateral vision, so that the supports may be safely used by the driver of a vehicle as well as by passengers in the vehicle.

Objects of the invention are to provide head support apparatuses for prevention of whiplash forms of injuries from collisions from any direction, which are comfortable and safe, which do not obstruct vision, and which are interchangeable with headrests which are commonly provided in vehicles such as automobiles and trucks.

Other objects and advantages of the invention will appear from the detailed descriptions of preferred embodiments of the invention, and from the accompanying drawings showing the preferred embodiments.

BRIEF DESCRIPTIONS OF THE DRAWINGS

FIG. 1 is a plan view, partly in horizontal cross section, of a preferred form of apparatus according to the invention.

FIG. 2 is a vertical cross-sectional view of the apparatus shown in FIG. 1, taken at line 2–2 of FIG. 1.

FIG. 3 is a plan view showing a second apparatus of preferred form according to the invention.

FIG. 4 is a vertical cross-sectional view of the apparatus shown in FIG. 3, taken at line 4–4 of FIG. 3.

In each of FIGS. 1—4, position of heads supported by the apparatuses are indicated by dashed lines.

DETAILED DESCRIPTIONS OF THE PREFERRED EMBODIMENTS

Referring first to the apparatus shown in FIGS. 1—2, a support frame or body 10 has a rectangular back portion 11 which is of flat plate form at its upper portion and which is thickened forwardly at its lower portion 12. Body 10 has side panels 13, 14, which are of flat plate form each having parallel horizontal upper and lower edges 17, 18 and a forwardly curved front edge 19.

Tubular support posts 22, 23 are fixed into thickened lower portion 12 of body 10 from the lower face thereof, and the lower ends of posts 22, 23 are each axially movably frictionally held in a tubular fitting 25 which is fixed into the top of seat back 26 of, for example, the seat of an automobile. The position of the head support is vertically adjustable by sliding the posts 22, 23 upwardly or downwardly in the fittings 25, so that the head support will be at the proper level to support the head of the person using it.

Body 10 is padded at its interior surfaces by covering 27 filled with padding 28. Covering 27 may be of any relatively soft flexible sheet material, e.g. fabric, plastic, leather, etc., and is fixed at its edges by bonding to the edges of body 10, and at its seams to other elements of the covering. Padding or stuffing 28 may be any suitable resilient or elastomeric cushioning material, e.g. foam plastic or rubber, kapok, feathers, down, synthetic or natural fibers, or the like. The padding and covering may be held onto frame or body 10 in any other suitable way known in the art.

Referring now to FIGS. 3—4, the support apparatus therein shown has a supporting frame or body 40, which is arcuate or curved as shown and which has at the center of its rearward portion the rearward projection 41 to which is connected the upright support bar 42, which may extend upward to the top of the head support at its upper end 43, or may terminate upwardly anywhere above the screws 45 which are received through perforations through bar 42 and screwed into tapped openings of body formation 41. Bar 42, at its lower end, is fixed by suitable means (not shown) to extend upwardly from the back of an automobile or other vehicle seat, and which may be, and preferably is, vertically adjustable to enable proper vertical adjustments of the head support.

Body 40 is smoothly formed throughout its length, and is entirely covered by padding 47 within covering layer 48, which may be of any of the materials described for covering 27 and padding 28 of the FIG. 1—2 embodiment of the apparatus. The outward form of the covering 48 may be flared or shaped, as best shown in FIG. 4, to give an attractive contour to the head support.

Formation 41 may extend through an opening of covering 48, as shown in FIG. 4, or the covering 48 may extend between formation 41 and bar 42, perforated by the screws 45.

The head 50 of a person is shown by dashed lines in FIGS. 1-—4. In FIG. 1, head 50 is shown turned (about a vertical axis) to an angular position 50a. Such turning of the head is permitted by both forms of apparatus shown in the drawings, since the sides or wings of the head supports, which extend to the sides of the head, do not closely fit the sides of the head, which would be unduly confining and uncomfortable especially over long periods of time. Turning of the head, especially to the driver of a vehicle, facilitates looking from side-to-side as necessary or desired.

It will be noted that in neither apparatus do the sides or wings of the head supports extend forward to such an extent as would blind the eyes and obscure vision. But the wings extend forward, preferably past the ears of the person, so that upon collision of the vehicle as heretofore discussed, the head is supported against all but essentially forward movements, whereby whiplash-type injuries are minimized or prevented.

To be most effective, the head supports should be vertically positioned at or near the vertical center of the head, so that the head will not tend to slide under or over the support during a collision, and the head supports should have sufficient vertical extent to achieve this result.

The head supports, in addition to preventing head movements causing injuries to the neck and spine, also serve to prevent the head from striking objects or other persons during collisions or impacts to the vehicle.

While preferred embodiments of the invention have been shown in the drawings and described, many modificatons thereof may be made by a person skilled in the art without departing from the spirit of the invention, and it is intended to protect by Letters Patent all forms of the invention falling within the scope of the following claims.

I claim:

1. Protective head support apparatus for mounting above the back support portion of a vehicle seat, comprising an integral head support element extending across the back of the head of a person and along each side of the head to terminate forwardly at each side of the head at a point rearward of the eye and forward of the ear, means supporting said head support element above the back support portion of a vehicle, said head support element being spaced outwardly from the sides of the head sufficiently to permit substantial sideways turning of the head, said head support element including padding means interiorly from one end to the other around the side and back portions of the head, the forward extents of the portions of said head support element along the sides of the head being such that the eyes are not covered thereby when the head is facing forward and when the head is turned sideways in said head support element in either direction, whereby said head support element supports the head against rearward and sideways motions without obscuring the vision of the user.

2. The combination of claim 1, said head support element being curved from end-to-end.

3. The combination of claim 1, the back and side portions of said head support element being straight, each side portion extending perpendicularly forward from the back portion thereof.

4. The combination of claim 1, said means supporting said head support element above the back support portion of a vehicle seat being vertically adjustable.